United States Patent [19]

Nelson

[11] Patent Number: 4,458,858
[45] Date of Patent: Jul. 10, 1984

[54] BOWED CASSETTE SHIM AND METHOD FOR MAKING

[75] Inventor: Norman E. Nelson, Roseville, Minn.

[73] Assignee: Minnesota Mining and Manufacturing Company, St. Paul, Minn.

[21] Appl. No.: 337,629

[22] Filed: Jan. 7, 1982

[51] Int. Cl.³ .................. G11B 15/32; G11B 23/04
[52] U.S. Cl. .................................. 242/199; 360/132
[58] Field of Search ........... 242/197, 198, 199, 200, 242/194; 360/132, 93, 96.1, 92; 352/72, 78 R; 264/229, 230; 156/145, 209, 212; 428/174

[56] References Cited

U.S. PATENT DOCUMENTS

| | | | |
|---|---|---|---|
| 3,556,433 | 1/1971 | Abitboul | 242/199 |
| 3,556,434 | 1/1971 | Koeppe | 242/199 |
| 3,777,311 | 12/1973 | Freixas | 264/229 X |
| 3,804,351 | 4/1974 | Kaneko et al. | 242/199 |
| 3,891,159 | 6/1975 | Nelson | 242/199 |
| 3,942,744 | 3/1976 | Fitterer et al. | 242/199 |
| 4,052,522 | 10/1977 | Narita | 428/174 X |
| 4,102,515 | 7/1978 | Milants | 242/199 |
| 4,174,080 | 11/1979 | Yamada | 242/199 |
| 4,201,612 | 5/1980 | Figge et al. | 428/174 X |

OTHER PUBLICATIONS

W. Earl Hanley, *Machine Design*, Mar. 20, 1975, pp. 74–77.

Primary Examiner—Leonard D. Christian
Assistant Examiner—Scott J. Haugland
Attorney, Agent, or Firm—Donald M. Sell; James A. Smith; David W. Anderson

[57] ABSTRACT

A method is described for forming a novel bowed shim for a cassette which includes impacting one surface of a sheet of polymeric material with particles until layer-like portions adjacent its surfaces are differentially expanded and the material is bowed, and then cutting the shim from the material.

6 Claims, 7 Drawing Figures

BOWED CASSETTE SHIM AND METHOD FOR MAKING

TECHNICAL FIELD

The present invention relates to methods for inducing stress patterns in a polymeric sheet to provide a desired contour for the sheet, and in two important aspects, to providing such stress patterns in a sheet from which a shim in a cassette may be formed, and the resultant structure of the shim.

BACKGROUND ART

Audio cassettes of the dual spool type generally called "Phillips" Cassettes commonly include shims between side surfaces of the spools and a case of the cassette. The purpose of the shims is to reduce friction against the sides of the spools and coils of tape wound around the spools as they rotate during use of the cassette, and to guide the tape as it is wound onto and off of the spools. Typically the shims have a plurality of raised portions formed by creasing or embossing that are found on various portions of the shim and may extend in various directions such as longitudinally of the shim or radially of the spools, which raised portions are intended to help these functions, and various patents such as U.S. Pat. No. 3,891,159 describe various patterns for these creases.

Such raised portions in a shim, however, do not always provide the degree of resilience for the shim that is desirable to center the spools and coils of tape, and the raised portions of the shims can provide areas of high wear concentration and can catch on portions of the spools or wound tape as the spools are rotated to move the tape therebetween, thus causing irregular movement of the tape and resultant distortions of the signals being read from the tape.

DISCLOSURE OF INVENTION

The present invention provides a method for causing a polymeric sheet to be stressed so that it normally has a predetermined uniform surface profile, which sheet can be stressed so that it can be used in forming shims with a novel structure that provides a high level of spool centering, tape guiding and friction reduction without resorting to the types of raised portions found in the prior art types of shims described above.

According to the present invention there is provided a shim adapted to be inserted between a case and side surfaces of spools in a cassette, which shim is of a resilient elastic polymeric material, and comprises a first layer-like portion of the shim defining a first surface of the shim adapted to contact the side surfaces of the spools, and a second layer-like portion on the side of the first layer-like portion opposite the first surface, with the first layer-like portion applying a generally uniform stress in all directions along the second layer-like portion to bow the shim and cause the first surface to be normally convex.

The term "layer-like portions" used herein with reference to the shim does not refer to separately identifiable layers of the shim (although it could if the shim had a laminate construction), but rather to portions of the shim that lie adjacent its opposite major surfaces.

When two such bowed shims are deflected and positioned on opposite sides of the spools with their convex first surfaces contacting the side surfaces of the spools, the shims will resiliently bias the spools toward a central position therebetween and will serve to improve guiding of the tape onto and off of the spools.

The bowed profile of the shims could be caused by several methods including drawing a thin sheet or film of the polymeric material from which the shim is to be made over an arcuate lip or domed surface to stretch and permanently deform one layer-like portion of the film more than the opposite layer-like portion thereof, or conceivably even by heat treatment of one of the film surfaces. The preferred method, however, comprises causing particles or beads to impact at least one of the surfaces of the film until such layer-like portions are formed.

Such impacting can be done in several ways, which may include moving a strip of the polymeric material from which the shim is to be made past a source of the particles being propelled via air pressure (e.g. through a device of the type commercially designated a "UNI-HONE" dry blasting system, available from Universal Finishing Machines, Inc., Buena Park, Calif., in which small diameter glass spheres (e.g. 53 to 105 microns in diameter) are propelled through a nozzle by air pressure.

Such impacting at one energy level will cause more expansion of the layer-like portion of the material having the surface being impacted than the opposite layer-like portion of the material so that the more expanded layer-like portion adjacent the impacted surface applies a generally uniform stress in all directions along the opposite layer-like portion. This will cause the material to bow so that the impacted surface will become cylindrically convex along the strip, and will cause small portions, such as a shim, cut from the strip of polymeric material to bow so that the impacted surface is spherically convex.

Impacting the strip with particles at a slightly higher energy level will begin to also cause expansion of the layer-like portion of the strip opposite the surface being impacted so that the strip material will lose its bow and its surfaces will become planar; and impacting the strip with particles at even higher energy levels will cause the layer-like portion of the strip opposite the surface being impacted to be expanded more than the layer-like portion having the impacted surface so that the material bows and the impacted surface becomes concave.

Examples of elastic resilient sheet materials that respond to the impacting by particles as indicated above and are suitable for use in making bowed shims for cassettes include thin sheets or films of ultra high molecular weight high density polyethylene which is carbon or graphite filled to provide improved dielectric and lubricating properties; and thin sheets or films of a polyester such as polyethylene terephthalate which is coated with graphite for dielectric and lubricating properties. Shims made from films of such materials have a sufficiently high modulus of elasticity to centrally bias the spools and coils of tape on the spools of cassettes in which they are inserted.

In addition to being useful in the method for forming shims of the type described above, such impacting of thin polymeric sheets or films provides a method for forming a uniform planar, concave or convex surface on a thin polymeric sheet or film initially having either an undesirable uniform surface contour or an undulating surface due to stresses included in the film during its manufacture. Typically the method used for this purpose comprises causing particles to impact one of the surfaces of the film until a layer-like portion of the film adjacent one of its surfaces applies a uniform stress in all directions along a layer-like portion adjacent its other surface to cause the film to have a desired surface profile which can be convex or concave as described above. The method can also include a step of subsequently impacting the other surface of the film to provide the final shape for the surface of the film, particularly where it is desired to minimize surface imperfections on both surfaces of the film.

BRIEF DESCRIPTION OF DRAWING

The present invention will be further described with reference to the accompanying drawing wherein like numbers refer to like parts in the several views and wherein.

BEST MODE FOR CARRYING OUT THE INVENTION

Figure 1:
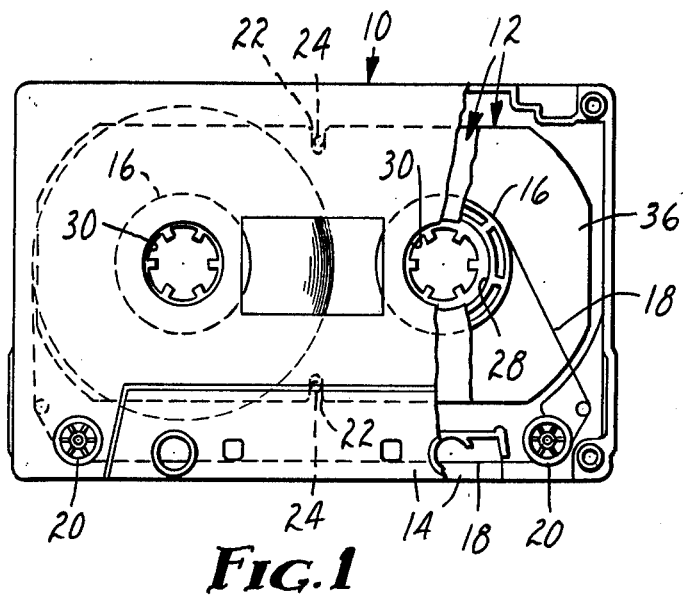
FIG. 1 is a plan view of a cassette including a pair of shims according to the present invention and having parts broken away to show details.

Referring now to the drawing there is shown in FIG. 1 a cassette 10 including a pair of shims according to the present invention generally designated by the reference numeral 12.

The cassette 10 is generally of the type called a dual spool "Phillips" type cassette which includes a two-part case 14; two spools 16 rotatably mounted in aligned axially parallel spaced relationship within the case 14; a length of magnetizable tape 18 having opposite end portions helically wound into coils about the spools 16; means including a pair of rollers 20 for defining a path for a portion of the tape 18 extending between the spools 16, and the two shims 12 on the opposite sides of the spools 16 between the spools and side walls of the case 14 which bias the spools 16 and coils of tape to a position centrally between the sidewalls of the case, guide the tape 18 moving onto and off of the coils of tape about the spools 16, and provide a low friction surface against which the spools 16 and tape 18 may move.

Figure 2:
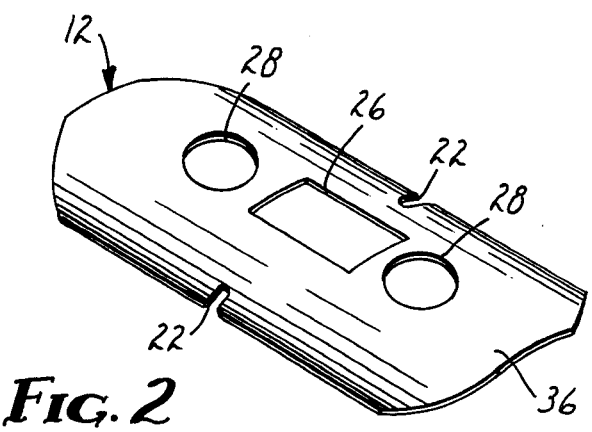
FIG. 2 is a perspective view of one of the shims shown in FIG. 1.
Figure 3:
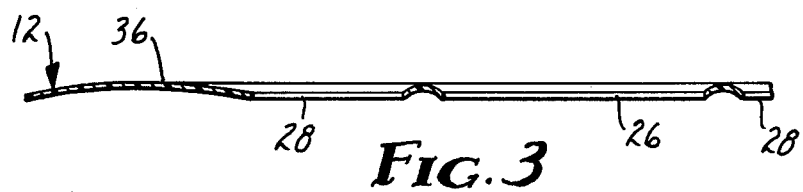
FIG. 3 is a sectional view of the shim shown in FIG. 2.

The shim 12 according to the present invention, best seen in FIGS. 2 and 3, is a sheet of thin (e.g. 0.1 mm thick) resilient elastic polymeric material which is generally rectangular in shape except for rounded corners, has opposite locating notches 22 centered along its edges adapted to receive locating posts 24 within the case 14, has a central rectangular opening 26 to allow viewing the size of the coils of tape on the spools 16 through the transparent case 14, and has spaced circular openings 28 which are positioned around access openings 30 for the spools 16 in the case 14. The shim 12 comprises a first layer-like portion adjacent the spools 16 and a second layer-like portion adjacent the case 14 with the first layer-like portion applying a stress in all directions along the second layer-like portion to bow the shim 12 and form a normally convex outer surface 36 on its first layer-like portion. When the shims 12 are in the cassette 10, the shims 12 are deflected and the convex surfaces 36 of the shims 12 contact with opposite side surfaces of the spools 16 and coils of the tape 18 around the spools 16 so that the shims 12 resiliently bias the spools 16 and coils of tape to a central position in the case 14.

The term "layer-like portions" used herein with reference to the shim 12 does not refer to separately identifiable layers of the shim 12 (although it could if the shim had a laminate construction), but rather to portions of the shim that lie adjacent its opposite major surfaces.

Figure 4:
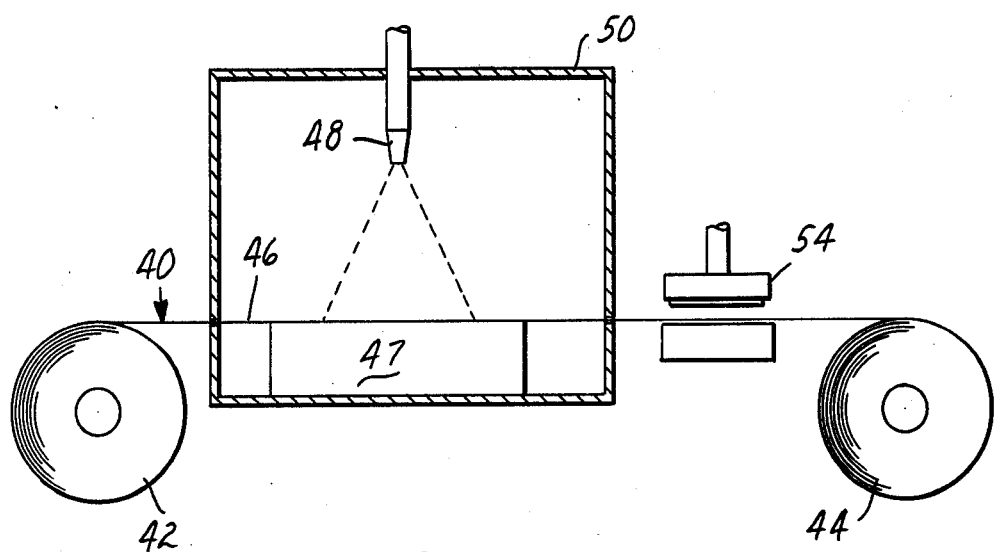
FIG. 4 is a schematic view of a method according to the present invention for forming the shim shown in FIGS. 1, 2 and 3.

The method for making the shim 12 is best seen in FIG. 4. As is schematically illustrated therein, the method generally includes (1) providing a thin sheet or film of resilient elastic polymeric material, which as illustrated may be a strip 40 of the material extending between a supply roll 42 and a take-up roll 44 and may be conveyed therebetween by rotation of the rolls 42, 44; (2) causing particles to impact at least one surface 46 of the material 40 as the material passes over a platen 47 until a layer-like portion of the material 40 adjacent one of its surfaces applies a stress in all directions along a layer-like portion of the material adjacent the other of its surfaces to cause the material 40 to bow uniformly (which as illustrated may be done via air pressure through a nozzle 48 via well known particle blasting techniques within an enclosure 50); and (3) cutting the shim 12 from the sheet of material, which as illustrated may be done with a die 54.

As an example, shims 12 of 0.1 mm thick carbon filled ultra high molecular weight high density polyethylene which are impacted by particles so that, as a test procedure, they provide a maximum bow of about 0.64 centimeters (0.25 in.) after they have been annealed in a 76.5° C. (170° F.) oven for 10 minutes (which annealing approximates the annealing that will naturally occur during the service life of the shim) have been found very satisfactory for use in "Phillips" type dual spool cassettes when deflected to about 0.3 cm (0.12 in.) from a flat plane upon assembly.

Figure 5:
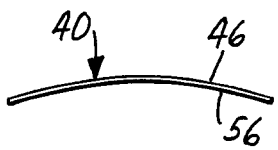
FIGS. 5, 6, and 7 schematically show the effect of impacting thin polymeric sheet material with particles at different levels of energy in accordance with the method illustrated in FIG. 3.
Figure 6:
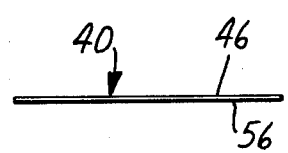
Figure 7:
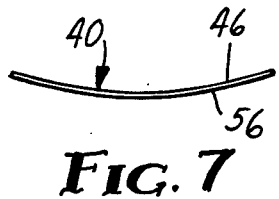

As is schematically illustrated in FIGS. 5, 6 and 7, impacting the surface 46 of the strip of material 40 with particles at a first level of energy will cause the layer-like portion of the material 40 adjacent the impacted surface 46 to expand more than the layer-like portion adjacent an opposite surface 56 of the material 40, and will thus cause the material 40 to bow so that the impacted surface 46 becomes convex and the opposite surface becomes concave (FIG. 5); impacting the surface 46 with particles at a somewhat higher level of energy will cause the layer-like portion adjacent the opposite surface 56 to expand about the same as the layer-like portion adjacent the impacted surface 46 so that the material 40 is not bowed and both major surfaces 46 and 56 of the material 40 will be planar (FIG. 6, long lengths of uniformly planar material would be difficult to form by this method, however); and impacting the surface 46 with particles at yet a higher level of energy will cause the layer-like portion adjacent the opposite surface 56 to expand more than the layer-like portion adjacent the impacted surface 46 so that the material 40 will bow and the impacted surface 46 will become concave and the opposite surface 56 will become convex (FIG. 7).

The method can thus be used to form a desired shape for the material with a convex, planar or concave surface on either the impacted or nonimpacted surface. It is possible to retain an original finish on one surface of a material and still shape that surface as desired by impacting the opposite surface of the material, which may be desirable in some instances. Alternatively, it is possible to reduce irregularities in the original finish on one surface of a material and simultaneously shape that surface by impacting it with the particles. The impacted surface of some materials appears to have lower coefficients of friction than their original finishes, which may be caused by reducing the size of irregularities. It is also possible to shape the surfaces of the material by impacting both surfaces of the material either simultaneously or sequentially, which may also be desirable in some instances.

A particularly useful result of the method is that it will remove undesirable uniform or nonuniform stresses induced in the material during its manufacture or otherwise while a desired uniform stress pattern is induced in the material to provide a desired material and surface shape (e.g. convex, planar, or concave). The particle impacting causes stress in the material that makes it bow so that its surfaces are normally generally spherically convex or spherically concave. When the material is impacted in a strip as illustrated in FIG. 4, however, the strip will attain only cylindrically concave and convex surfaces along a longitudinal axis until sections are severed from the strip, whereupon the spherically concave and convex nature of the surfaces will be apparent.

I claim:

1. In a cassette of the type including a case, two spools rotatably mounted in aligned, axially parallel, spaced relationship within the case, a length of tape having opposite end portions helically wound in coils about the spools and having a portion extending therebetween, means on the case defining a path for the portion of tape extending between the coils, and a pair of shims of resilient elastic polymeric material on the opposite sides of said spools between said spools and said case, the improvement wherein said shims each comprise a first layer-like portion adjacent said spools and a second layer-like portion adjacent said case with said first layer-like portion applying a stress in all directions along said second layer-like portion to form in the free, unassembled state of said shim a spherically convex outer surface on said first layer-like portion, said shims being resiliently deflected between said case and said spools to bias said spools to central positions therebetween.

2. A cassette according to claim 1 wherein said polymeric material is carbon filled ultra high molecular weight density polyethylene.

3. A cassette according to claim 1 wherein said polymeric material is graphite coated polyester.

4. A shim adapted to be inserted between a case and side surfaces of spools in a cassette, wherein said shim is of a resiliently elastic polymeric material and comprises a first layer-like portion defining a first surface of said shim adapted to contact the side surfaces of the spools, and a second layer-like portion on the side of said first layer-like portion opposite said first surface, said first layer-like portion applying a stress in all directions along said second layer-like portion to bow said shim in its free state, prior to insertion and cause said first surface to be spherically convex.

5. A shim according to claim 4 wherein said polymeric material is carbon filled ultra high molecular weight high density polyethylene.

6. A shim according to claim 4 wherein said polymeric material is graphite coated polyester.

* * * * *